US010519635B2

(12) United States Patent
Fourman et al.

(10) Patent No.: US 10,519,635 B2
(45) Date of Patent: Dec. 31, 2019

(54) EXPOSED HOSE FAUCET

(71) Applicant: Delta Faucet Company, Indianapolis, IN (US)

(72) Inventors: Terrence Lee Fourman, Westfield, IN (US); Jeffrey Lee Moore, Frankfort, IN (US); Randy L. Schneider, II, Carmel, IN (US); Alfred Charles Nelson, Westfield, IN (US); Kurt Judson Thomas, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 175 days.

(21) Appl. No.: 15/639,414

(22) Filed: Jun. 30, 2017

(65) Prior Publication Data
US 2019/0003162 A1 Jan. 3, 2019

(51) Int. Cl.
*E03C 1/04* (2006.01)
*F16K 11/00* (2006.01)

(52) U.S. Cl.
CPC .......... *E03C 1/0403* (2013.01); *E03C 1/0405* (2013.01); *F16K 19/006* (2013.01); *E03C 1/0412* (2013.01); *E03C 2001/0414* (2013.01); *Y10T 137/9464* (2015.04)

(58) Field of Classification Search
CPC .... E03C 1/0403; E03C 1/0412; E03C 1/0405; E03C 2001/0414; F16K 19/006; Y10T 137/9464
See application file for complete search history.

(56) References Cited

U.S. PATENT DOCUMENTS

| 1,714,232 | A | 5/1929 | Morris |
| 2,492,049 | A | 12/1949 | Krone et al. |
| 3,941,157 | A | 3/1976 | Barnett |
| 4,431,031 | A | 2/1984 | Ettlinger |
| 4,478,435 | A | 10/1984 | Cheshier et al. |
| 4,709,715 | A | 12/1987 | Knight |
| 5,036,891 | A | 8/1991 | Vogelsang |
| 5,185,893 | A | 2/1993 | Lin |
| 5,624,074 | A | 4/1997 | Parisi |
| 6,092,541 | A | 7/2000 | Crane et al. |
| 6,568,610 | B1 | 5/2003 | Ericksen |
| 6,820,291 | B1 | 11/2004 | Weaver |
| D534,990 | S | 1/2007 | Zhou |
| D585,110 | S | 1/2009 | Paini |
| D620,557 | S | 7/2010 | Eilmus |
| 7,753,079 | B2 | 7/2010 | Nelson |
| 8,061,386 | B2 | 11/2011 | Mueller et al. |

(Continued)

FOREIGN PATENT DOCUMENTS

CN 105822791 8/2016

OTHER PUBLICATIONS

101Bathrooms.com; Bathroom Design Ideas; retrieved Feb. 7, 2017; https://101bathrooms.com/101/commercial-kitchen-faucets.html/fascinating-commercial-kitchen-faucets-simple-kitchen-decoration-ideas-with-commercial-kitchen-faucets.

*Primary Examiner* — Marina A Tietjen
*Assistant Examiner* — Frederick D Soski
(74) *Attorney, Agent, or Firm* — Faegre Baker Daniels LLP

(57) ABSTRACT

A fluid delivery device comprises a faucet. The faucet includes a hub, a sprayhead, and a hose coupling the hub to the sprayhead. Each end of the hose has a pivot coupling. One of the pivot couplings is configured to permit rotation of the hose relative to the hub. Another of the pivot couplings is configured to permit rotation of the sprayhead relative to the hose.

16 Claims, 12 Drawing Sheets

(56) References Cited

U.S. PATENT DOCUMENTS

| | | | |
|---|---|---|---|
| D651,284 S | 12/2011 | Flowers et al. | |
| 8,070,076 B2 | 12/2011 | Erickson et al. | |
| 8,104,113 B2 | 1/2012 | Rodenbeck et al. | |
| D685,881 S | 7/2013 | Fritz | |
| D687,127 S | 7/2013 | Fritz | |
| 8,496,028 B2 | 7/2013 | Nelson et al. | |
| 8,621,681 B2 | 1/2014 | Macan et al. | |
| 8,713,725 B2 | 5/2014 | Alder et al. | |
| 8,869,821 B2 | 10/2014 | Laera | |
| 9,181,685 B2 | 11/2015 | Esche et al. | |
| 9,315,975 B2 | 4/2016 | Davidson et al. | |
| 9,435,107 B2 | 9/2016 | Rexach et al. | |
| 9,568,132 B2 | 2/2017 | Erickson et al. | |
| 9,850,642 B2 | 12/2017 | Enlow et al. | |
| 2003/0226200 A1 | 12/2003 | Charonis | |
| 2007/0251590 A1 | 11/2007 | Weinstein | |
| 2009/0120516 A1 | 5/2009 | Paini | |
| 2011/0056577 A1 | 3/2011 | Ilett | |
| 2013/0019974 A1 | 1/2013 | Laera | |
| 2013/0213509 A1* | 8/2013 | Thomas | E03C 1/04 137/801 |
| 2014/0015246 A1 | 1/2014 | Erickson et al. | |
| 2014/0069520 A1 | 3/2014 | Esche et al. | |
| 2014/0261821 A1 | 9/2014 | Bigott | |
| 2014/0345726 A1* | 11/2014 | Seggio | F16K 19/006 137/606 |
| 2015/0308088 A1 | 10/2015 | Enlow et al. | |
| 2016/0208464 A1* | 7/2016 | DeVries | E03C 1/0404 |
| 2016/0215482 A1 | 7/2016 | Fourman et al. | |
| 2016/0237663 A1 | 8/2016 | Myers et al. | |
| 2016/0258143 A1 | 9/2016 | Bosio | |
| 2017/0059050 A1* | 3/2017 | Chiu | E03C 1/04 |
| 2017/0350104 A1* | 12/2017 | Clarke | E03C 1/0404 |
| 2017/0362803 A1 | 12/2017 | Enlow et al. | |
| 2018/0030700 A1* | 2/2018 | Zindler | E03C 1/0405 |

\* cited by examiner

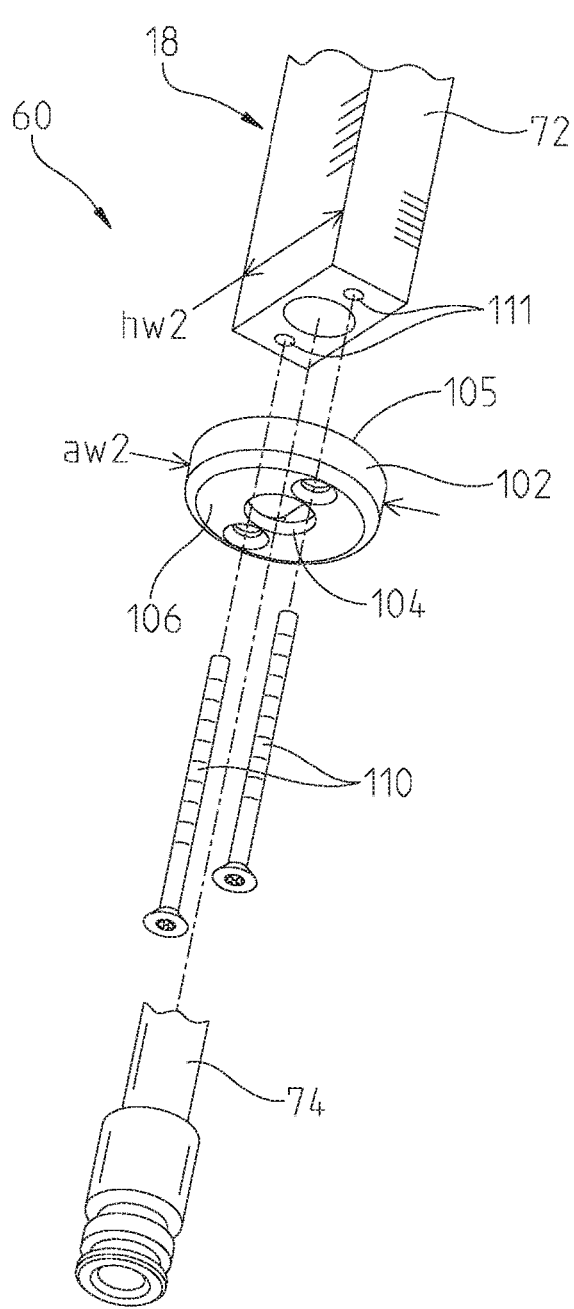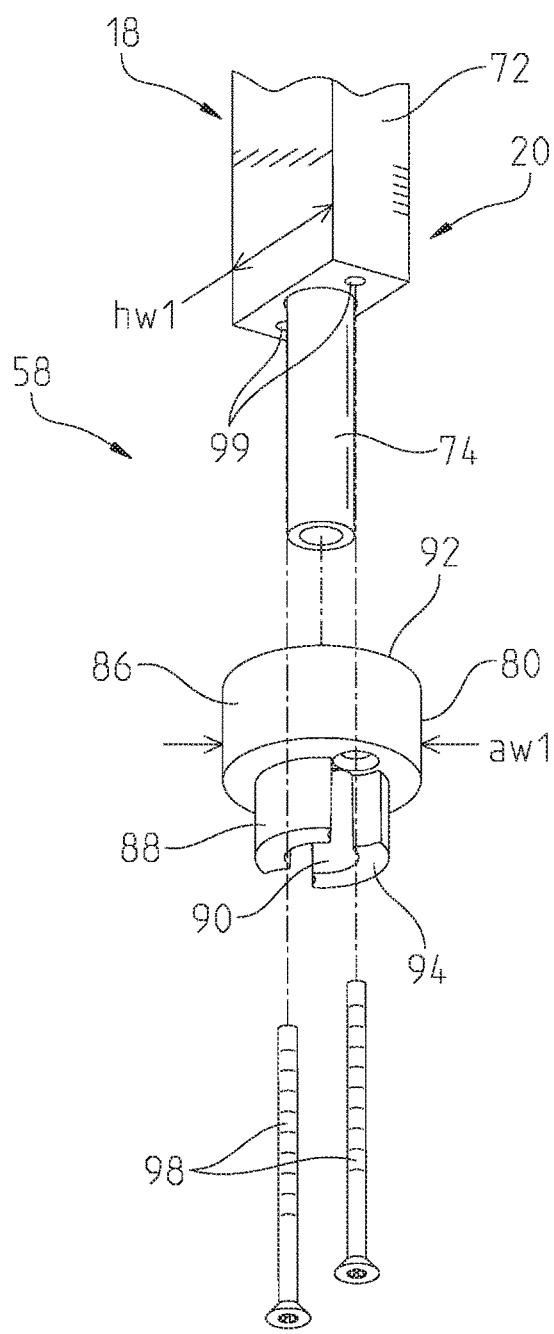
Fig. 6B
Fig. 6A

EXPOSED HOSE FAUCET

BACKGROUND AND SUMMARY OF THE DISCLOSURE

The present invention generally relates to faucets and, more particularly, to a faucet including an exposed hose assembly including a non-cylindrical outer surface and supported by a rotatable coupling.

Kitchen faucets including a pullout sprayhead or wand are known in the art. Such faucets may include a spout having a first or input end rotatably supported by a hub. The sprayhead may be releasably coupled to a second or output end of the spout. A flexible hose is illustratively slidably received within the spout, and fluidly couples the sprayhead to hot and cold water supplies through a mixing valve.

According to an illustrative embodiment of the present disclosure, a faucet includes a hub, a hose including a polygonal shaped transverse cross section, the hose extending between a first end and a second end opposite the first end, the first end of the hose operably coupled to the hub, and a sprayhead operably coupled to the second end of the hose. A first pivot coupling is operably coupled to the hub and the first end of the hose, the first pivot coupling including a first adapter configured to permit rotation of the hose relative to the hub. A second pivot coupling is operably coupled to the sprayhead and the second end of the hose, the second pivot coupling including a second adapter configured to permit rotation of the sprayhead relative to the hose.

In another illustrative embodiment of the present disclosure, the faucet may further comprise a swing arm including a first end operably coupled to the hub and a second end supporting the sprayhead, wherein the hose extends above the swing arm. In another illustrative embodiment, the faucet may further comprise a magnetic coupling releasably coupling the sprayhead to the second end of the swing arm. In a further illustrative embodiment, the faucet may further comprise a capacitive coupling positioned between the hub and the swing arm, a capacitive sensor operably coupled to the swing arm through the capacitive coupling, a controller operably coupled with the capacitive sensor, and an actuator driven valve fluidly coupled to the hose and controlled by the controller.

In accordance with other embodiments of the present disclosure, the hose may further include an outer sheath having a rectangular shaped transverse cross section, and an inner waterway received within the outer sheath, the inner waterway defined by a cylindrical tube. In another illustrative embodiment, the outer sheath may comprise a flexible material. Illustratively, the first adapter of the first pivot coupling is coupled to the outer sheath at the first end of the hose, and the second adapter of the second pivot coupling is coupled to the outer sheath at the second end of the hose.

According to another illustrative embodiment of the present disclosure, a faucet includes a hub, a hose including a first end and a second end opposite the first end, the first end of the hose operably coupled to the hub, and a sprayhead operably coupled to the second end of the hose. The hose illustratively includes an outer sheath, and an inner waterway received within the outer sheath. Illustratively, a first pivot coupling is operably coupled to the hub and the first end of the hose, the first pivot coupling including a first adapter configured to permit rotation of the hose relative to the hub, and a second pivot coupling operably coupled to the sprayhead and the second end of the hose, the second pivot coupling including a second adapter configured to permit rotation of the sprayhead relative to the hose.

In a further illustrative embodiment of the present disclosure, the faucet may further comprise a swing arm having a first end and second end, the swing arm operably coupled to the hub at the first end and configured to rotate about a longitudinal axis of the hub, the swing arm configured to support the sprayhead at the second end. In another illustrative embodiment, the faucet may further include a capacitive coupling positioned between the hub and the swing arm, a capacitive sensor operably coupled to the swing arm through the capacitive coupling, a controller operably coupled with the capacitive sensor, and an actuator driven valve fluidly coupled to the hose and controlled by the controller.

In accordance with other illustrative embodiments of the present disclosure, the first adapter may comprise an axially extending housing including a first end and a second end opposite the first end, the first adapter configured to allow the inner waterway to pass through the first end to the second end of the axially extending housing along a centerline of the axially extending housing. In another illustrative embodiment, the first adapter may include an upper surface and a lower surface opposite the upper surface, the upper surface having a hose recess configured to support the outer sheath of the hose. In a further illustrative embodiment, the second adapter may include an upper surface and a lower surface opposite the upper surface, the upper surface having a hose recess configured to support the outer sheath of the hose. In another illustrative embodiment, the hose may further comprise a rectangular shaped transverse cross section and a flexible material.

In another illustrative embodiment of the present disclosure, a first adapter width is defined by an outer periphery of the first adapter, a first end hose width defined by an outer periphery of the first end of the hose, the first adapter width greater than the first end hose width. In another illustrative embodiment, a second adapter width is defined by an outer periphery of the second adapter, a second end hose width is defined by an outer periphery of the second end of the hose, the second adapter width greater than the second end hose width.

Certain illustrative embodiments of the present disclosure provide faucets that effectively permit relative rotation of the components and utilize a non-cylindrical hose assembly. In accordance with some forms of the present disclosure, such faucets comprise rotatable couplings and a polygonal hose assembly. Accordingly, one illustrative embodiment faucet includes a hub, a hose including a polygonal shaped transverse cross section, the hose having a first end and a second end, the first end of the hose operably coupled to the hub, a sprayhead operably coupled to the second end of the hose, a first pivot coupling operably coupled to the hub and the first end of the hose, the first pivot coupling including a first adapter configured to permit rotation of the hose relative to the hub, and a second pivot coupling operably coupled to the sprayhead and the second end of the hose, the second pivot coupling including a second adapter configured to permit rotation of the sprayhead relative to the hose.

In an illustrative embodiment of the present disclosure, the hose may further include an outer sheath having a rectangular shaped transverse cross section, the outer sheath enclosing an inner waterway comprising a cylindrical tube. In a further illustrative embodiment, the outer sheath comprises a thermoplastic elastomer and the inner waterway comprises a cross-linked polyethylene.

In another illustrative embodiment of the present disclosure, the faucet further comprises a swing arm having a first end and a second end, the swing arm operably coupled to the hub at the first end, the swing arm configured to support the sprayhead at the second end and configured to rotate about a longitudinal axis of the hub. In a further illustrative embodiment, the faucet further comprises a magnetic coupling releasably coupling the sprayhead to the second end of the swing arm. In another illustrative embodiment, the faucet further comprises a capacitive coupling positioned between the hub and the swing arm, a capacitive sensor operably coupled to the swing arm through the capacitive coupling, a controller operably coupled with the capacitive sensor, and an actuator driven valve fluidly coupled to the hose and controlled by the controller.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF DRAWINGS

A detailed description of the drawings particularly refers to the accompanying figures in which:

FIG. 6A is an exploded perspective view of an inlet end pivot coupling of the hose assembly of the illustrative faucet of FIG. 1;

FIG. 6B is an exploded perspective view of an outlet end pivot coupling of the hose assembly of the illustrative faucet of FIG. 1;

DETAILED DESCRIPTION OF THE DRAWINGS

The embodiments of the invention described herein are not intended to be exhaustive or to limit the invention to the precise form disclosed. Rather, the embodiments selective for description have been chosen to enable one skilled in the art to practice the invention.

Figure 1:
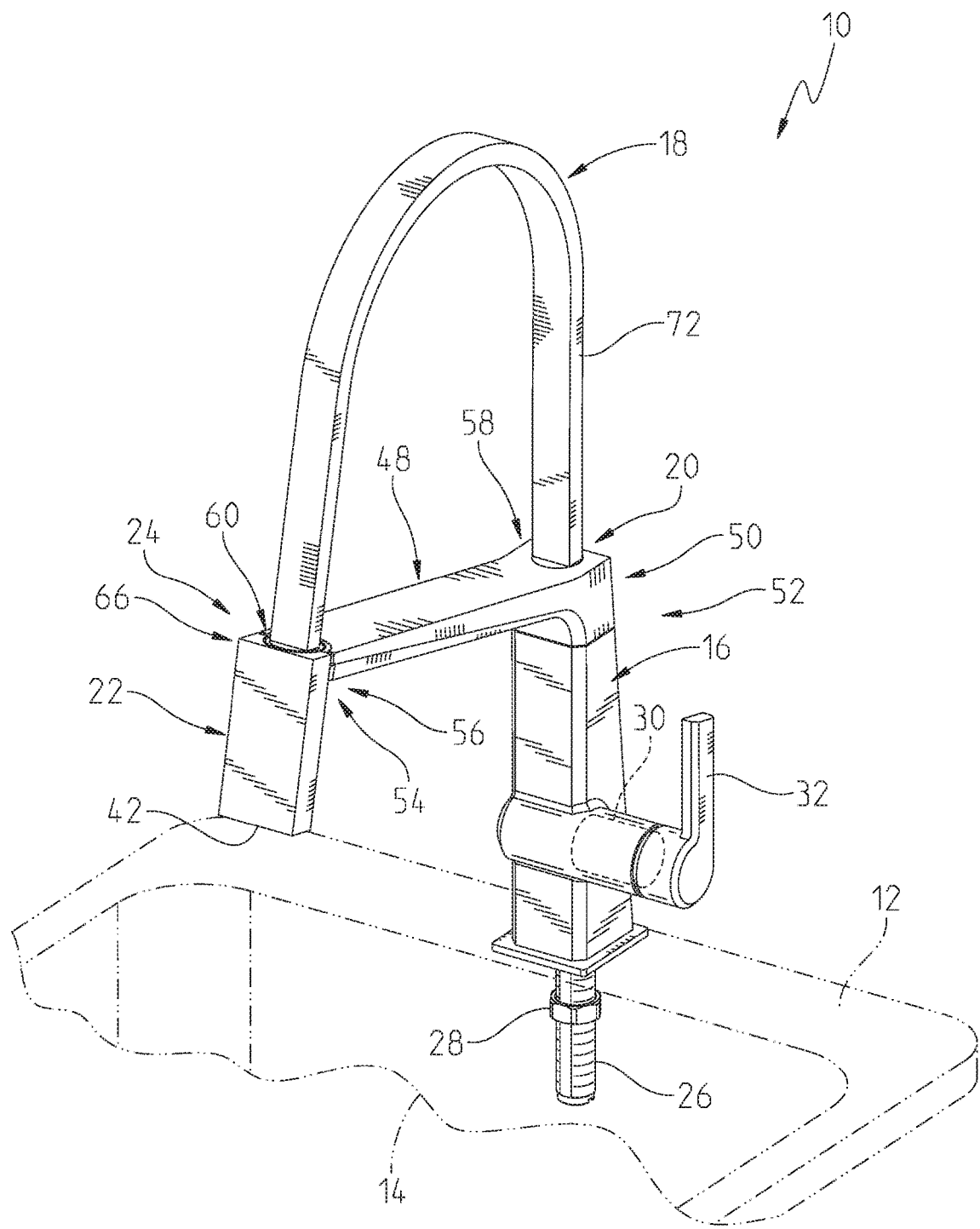
FIG. 1 is a perspective view of an illustrative faucet of the present disclosure supported by a sink deck.
Figure 2:
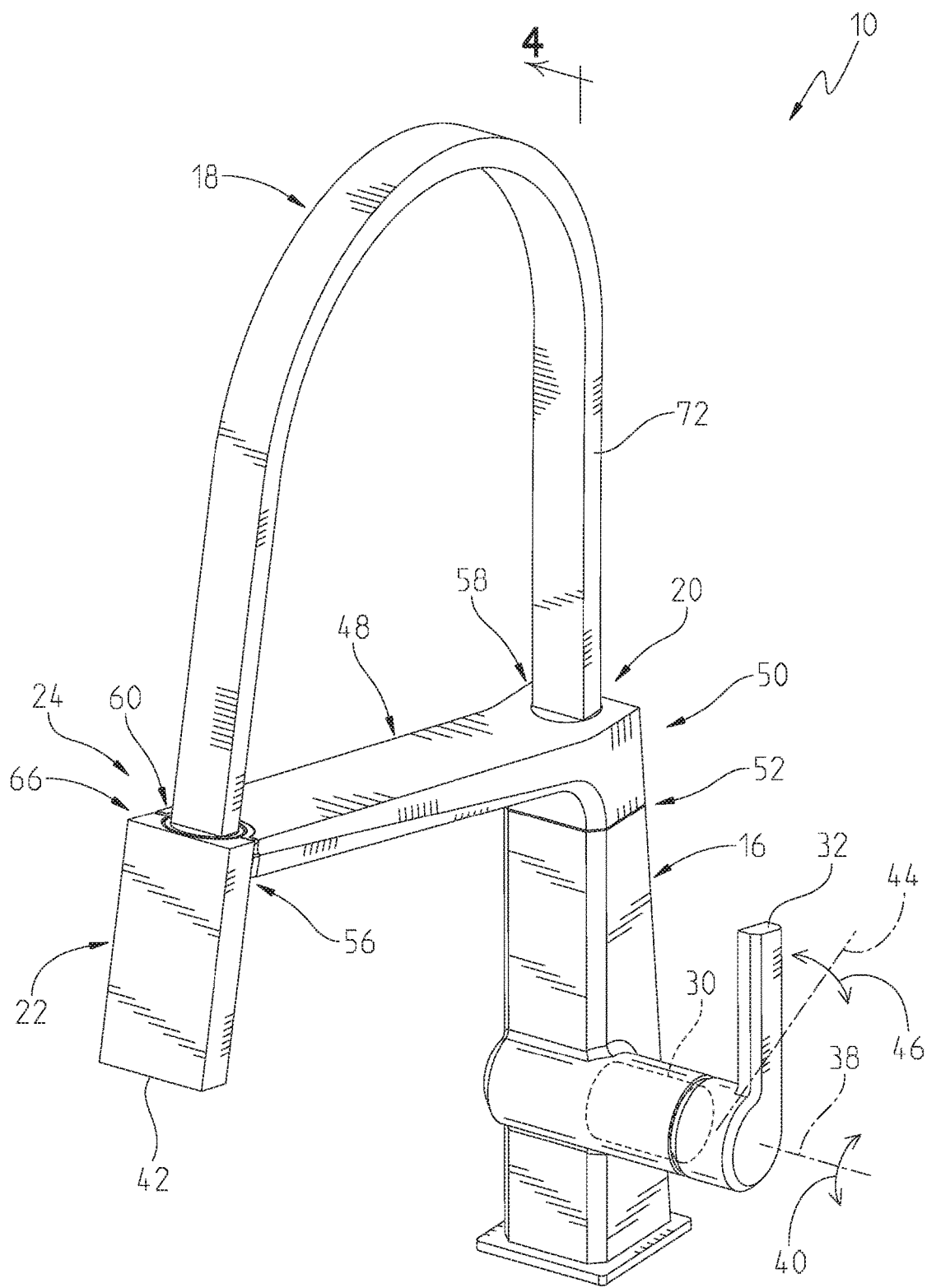
FIG. 2 is a perspective view of the illustrative faucet of FIG. 1.
Figure 3:
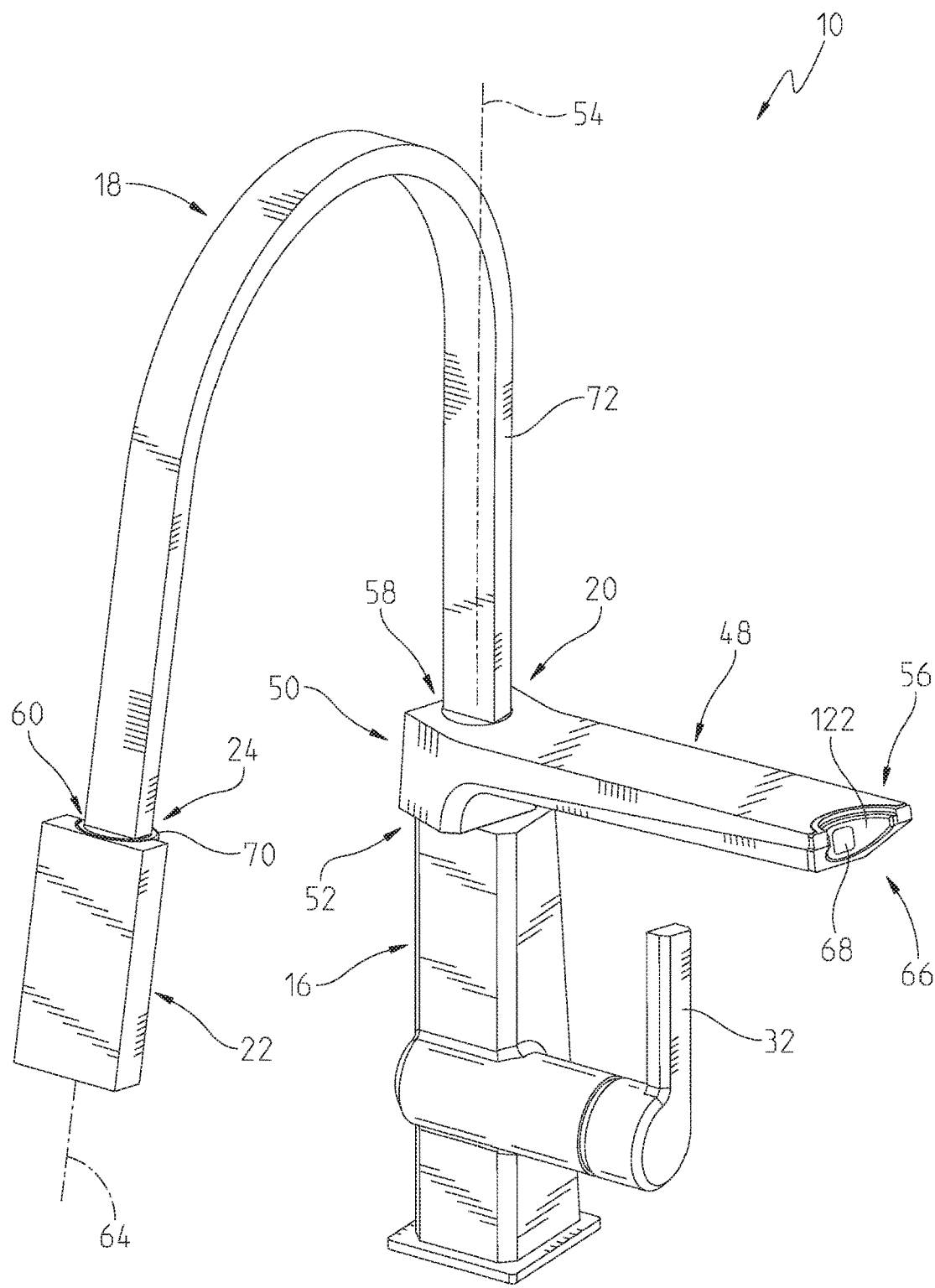
FIG. 3 is a perspective view of the illustrative faucet of FIG. 1, showing the sprayhead uncoupled from the swing arm and the support arm rotated counterclockwise.

Referring initially to FIGS. 1-3, an illustrative faucet 10 of the present disclosure is shown coupled to a mounting deck, illustratively a sink deck 12 surrounding a sink basin 14. As further detailed herein, the illustrative faucet 10 includes a hub 16, a hose 18 having a first or inlet end 20 operably coupled to the hub 16, and a wand or sprayhead 22 fluidly coupled to a second or outlet end 24 of the hose 18.

Figure 8:
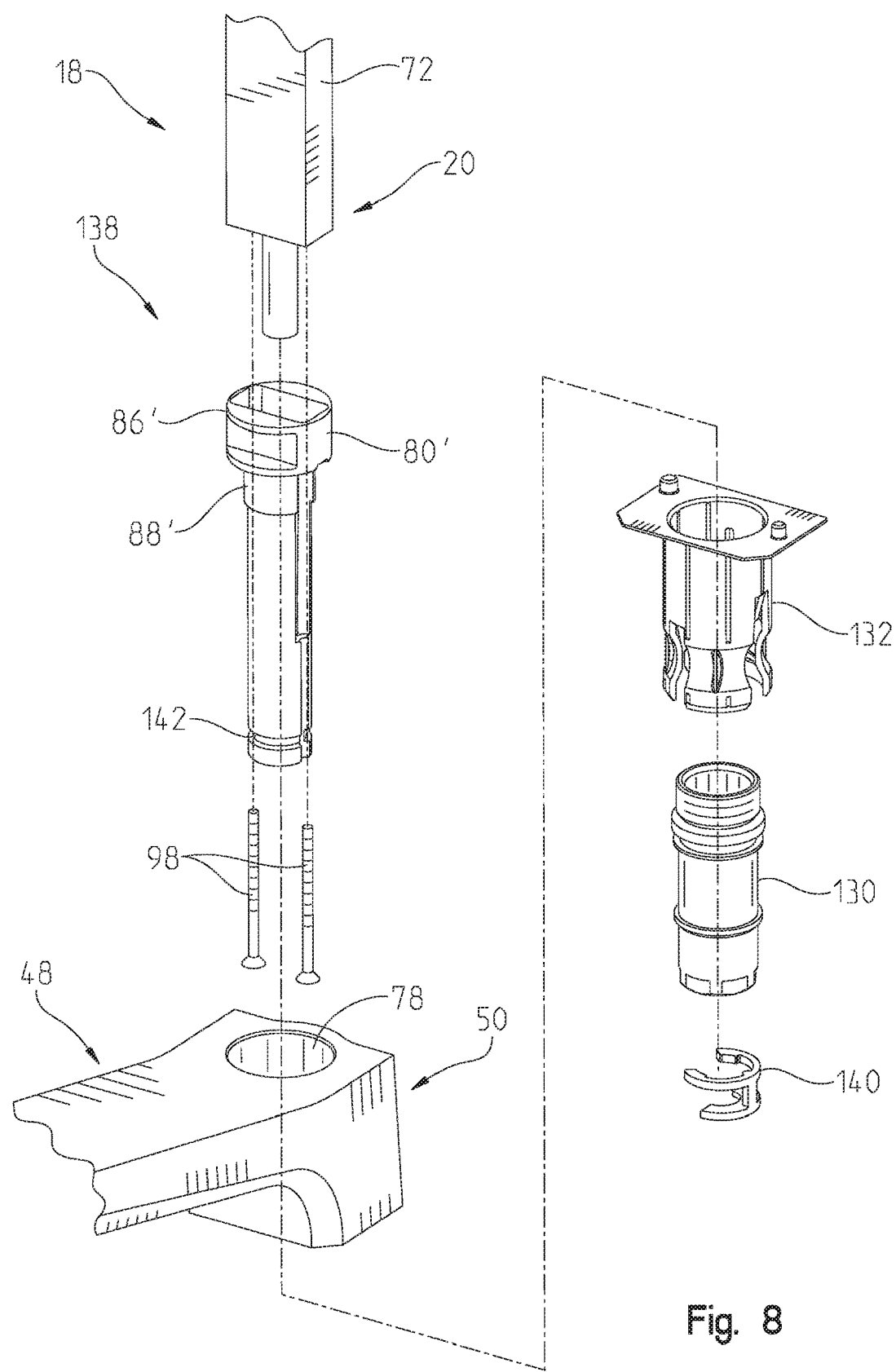
FIG. 8 is an exploded perspective view of another illustrative embodiment inlet end pivot coupling of the hose assembly.

Illustratively, a mounting shank 26 and a cooperating nut 28 couple the hub 16 to the sink deck 12 (FIG. 1). The hub 16 illustratively includes a passageway 29, and supports a conventional mixing valve 30 including a movable valve member (not shown) operably coupled to a handle 32. Hot and cold water sources 34a, 34b are illustratively fluidly coupled to the mixing valve 30 via supply conduits (illustratively, flexible tubes) 36a, 36b, respectively (FIG. 8). As is known, rotation of the handle 32 about a first axis 38 (as shown by arrows 40 in FIG. 2) controls water temperature to a water outlet 42 defined by the sprayhead 22. Similarly, rotation of the handle 32 about a second axis 44 (as shown by arrows 46 in FIG. 2) controls water flow rate to the water outlet 42.

A swing arm 48 is rotatably supported by the hub 16. More particularly, a first end 50 of the swing arm 48 is rotatably coupled to the hub 16 by a swing arm rotatable coupling 52. As shown in FIG. 3, the swing arm pivot coupling 52 is configured to permit rotation of the swing arm 48 about an upwardly extending longitudinal axis 54 of hub 16. The sprayhead 22 is releasably coupled to a second end 56 of the swing arm 48.

Figure 4:
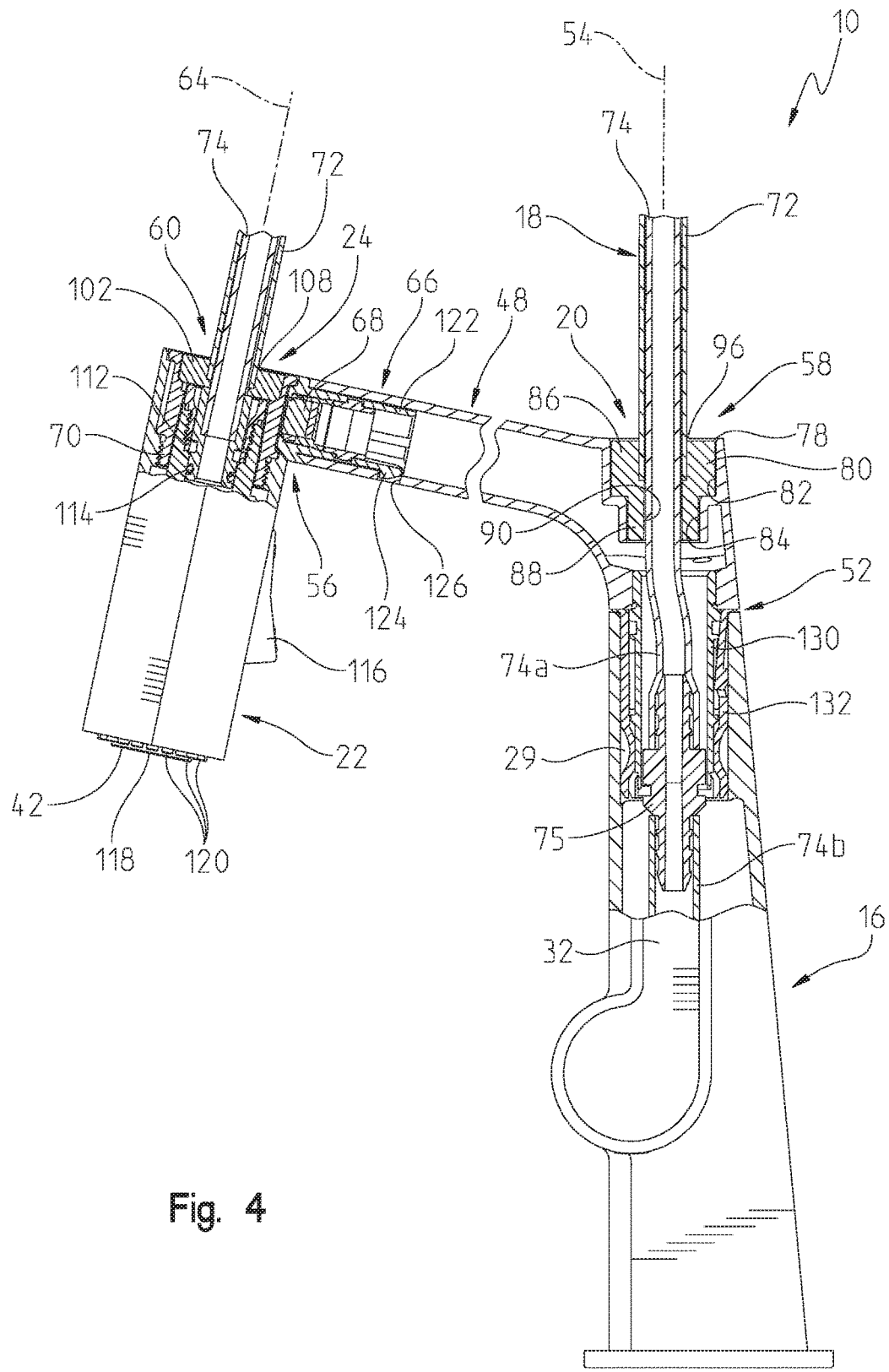
FIG. 4 is a partial cross-sectional view along line 4-4 of FIG. 2.
Figure 5:
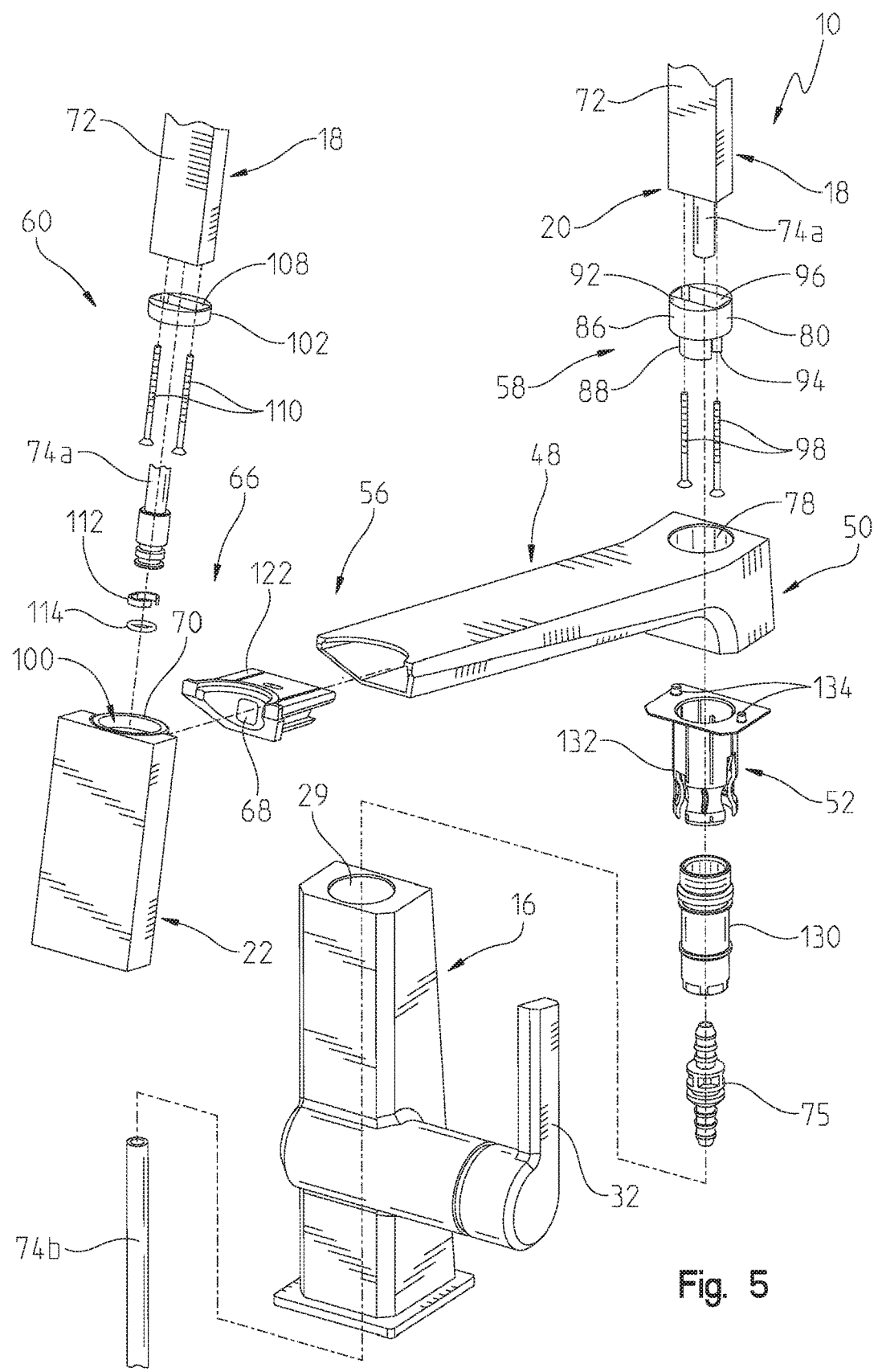
FIG. 5 is an exploded perspective view of the illustrative faucet of FIG. 1.

With reference to FIGS. 4 and 5, an inlet end or first pivot coupling 58 is configured to permit rotation of the first end 20 of the hose 18 relative to the hub 16 and the swing arm 48. As shown in FIGS. 3 and 4, the first pivot coupling 58 is configured to rotate the first end 20 of the hose 18 about the longitudinal axis 54. An outlet end or second pivot coupling 60 is configured to permit rotation of the sprayhead 22 relative to the second end 24 of the hose 18. As shown in FIGS. 3 and 4, the second pivot coupling 60 is configured to rotate the sprayhead 22 about an upwardly extending longitudinal axis 64 of the sprayhead 22.

As further shown in FIG. 3, the swing arm 48 may rotate relative to the hub 16, and independently of the hose 18 and the sprayhead 22. In the illustrative embodiment, the first pivot coupling 58 is configured to permit the swing arm 48 to rotate independent of hose 18. The swing arm 48 may rotate independent of the sprayhead 22 because the sprayhead 22 releasably couples to the second end 56 of the swing arm 48. In this way, a user may rotate the swing arm 48 about the longitudinal axis 54 of hub 16 without likewise moving the sprayhead 22.

Additionally a user may rotate the swing arm 48 about the longitudinal axis 54 of the hub 16 in a first direction (e.g., clockwise) via the rotatable coupling 52, while moving the sprayhead 22 in a second direction opposite the first direction (e.g., counterclockwise) via the second pivot coupling 60. Moreover, a user may retain the sprayhead 22 on the second end 56 of swing arm 48 and rotate both the sprayhead 22 and the swing arm 48 in the same direction together or in opposite directions.

As shown in FIGS. 4 and 5, a releasable coupler, such as a magnetic coupler 66, illustratively releasably couples to the second end 56 of swing arm 48 to the sprayhead 22. The magnetic coupler 66 illustratively includes a magnet 68 supported by the second end 56 of the swing arm 48, and a metal washer 70 supported by the sprayhead 22. A variety of different couplings may releasably couple the sprayhead 22 to the second end 56 of swing arm 48, including, for example, flexible retaining fingers, bayonet couplings, etc.

With reference to FIGS. 4 and 5, the hose 18 illustratively comprises an outer sheath 72 that receives an inner waterway 74. In the illustrative embodiment shown, the outer sheath 72 includes a non-circular shaped transverse cross-section. More particularly, the outer sheath 72 has a polygonal shaped transverse cross-section, illustratively a rectangular shaped transverse cross section. Additionally, outer sheath 72 may be molded from a flexible material, such as a thermoplastic elastomer (TPE). Illustratively, the outer sheath 72 may be formed of a thermoplastic vulcanizate (TPV), such as Santoprene™, available from United States Plastic Corp. of Lima, Ohio.

The inner waterway 74 illustratively comprises a cylindrical tube. This cylindrical tube may be formed from a flexible material, such as a polymer. Illustratively, the inner waterway 74 is formed of a cross-linked polyethylene (e.g., PEX). As shown in FIG. 5, the inner waterway 74 may include first and second portions 74a and 74b fluidly coupled together with a conventional barbed connector 75. Alternatively, the inner waterway 74 may be formed as a single component. Illustratively, the structural and material properties of the hose 18 permit bending of the outer sheath 72 and the inner waterway 74 about axes extending perpendicular to the longitudinal axis of the hose 18, and permit twisting of the outer sheath 72 about the longitudinal axis of the hose 18.

With reference to FIGS. 4-6A, the first pivot coupling 58 illustratively includes a circular recess 78 within the first end 50 of the swing arm 48 receiving a first adapter, illustratively a rotatable housing 80. More particularly, the circular recess 78 illustratively includes an upper bore 82 having a first inner diameter, and a lower bore 84 having a second inner diameter, the first inner diameter being greater than the second inner diameter. The housing 80 illustratively extends axially between an upper portion 86 received within the upper bore 82, and a lower portion 88 received within the lower bore 84 (FIG. 4).

The upper portion 86 of the housing 80 is coupled to the outer sheath 72 at the first end 20 of the hose 18. A bore 90 extends axially along a centerline of the housing 80 and receives the inner waterway 74 of the hose 18. The upper portion 86 of the housing 80 includes an upper surface 92 and a lower surface 94. A hose recess 96 extends downwardly from the upper surface 92 for receiving the outer sheath 72 of the hose 18. Conventional fasteners, such as bolts 98, may be received within openings 99 in the outer sheath 72 to secure the outer sheath 72 to the upper portion 86 of the housing 80. With reference to FIG. 6A, a first adapter width (aw1) is defined by an outer periphery of the upper portion 86 of the housing 80, and a first end hose width (hw1) is defined by an outer periphery of the first end 20 of the hose 18. The first adapter width (aw1) is illustratively greater than the first end hose width (hw1).

With reference to FIGS. 4, 5 and 6B, the second pivot coupling 60 illustratively includes a circular recess or opening 100 within the sprayhead 22 receiving a second adapter, illustratively a rotatable disc 102. A bore 104 extends axially along a centerline of the disc 102 and receives the inner waterway 74 of the hose 18. The disc 102 is illustratively coupled to the outer sheath 72 at the second end 24 of the hose 18. The disc 102 illustratively includes an upper surface 105 and a lower surface 106. A hose recess 108 extends downwardly from the upper surface 105 for receiving the outer sheath 72 of the hose 18. Conventional fasteners, such as bolts 110, may be received within openings 111 in the outer sheath 72 to secure may secure the outer sheath 72 to the disc 102. A second adapter width (aw2) is defined by an outer periphery of the disc 102, and a second end hose width (hw2) is defined by an outer periphery of the second end 24 of the hose 18. The second adapter width (aw2) is illustratively greater than the second end hose width (hw2). The inner waterway 74 is illustratively coupled to the sprayhead 22 by a retaining clip 112 and an o-ring 114.

The illustrative sprayhead 22 further includes a user interface, such as a toggle or rocker switch 116. Illustratively, a user may operate the switch 116 to change the characteristics or modes of water exiting the outlet 42. For example, the switch 116 may move a diverter valve (not shown) between an aerated stream mode and a spray mode. More particularly, and with further reference to FIG. 4, the outlet 42 may include an aerated stream outlet 118 (defining the stream mode) and a plurality of sprayer outlets 120 (defining the spray mode).

As noted above, the sprayhead 22 also illustratively includes a magnetically attractive member, such as the metal washer 70, which magnetically engages with the magnet 68 to magnetically couple the sprayhead 22 to the second end 56 of swing arm 48. The metal washer 70 may concentrically surround second pivot coupling 60 and define the opening 100, as shown in FIGS. 4 and 5. A nest 122 is illustratively supported by the second end 56 of swing arm 48. The nest 122 supports the magnet 68 for releasably supporting and coupling the sprayhead 22. As shown in FIG. 4, a retainer, such as a resilient finger or tab 124, is illustratively received within an opening 126 to secure the nest 122 to the swing arm 48.

Figure 7:
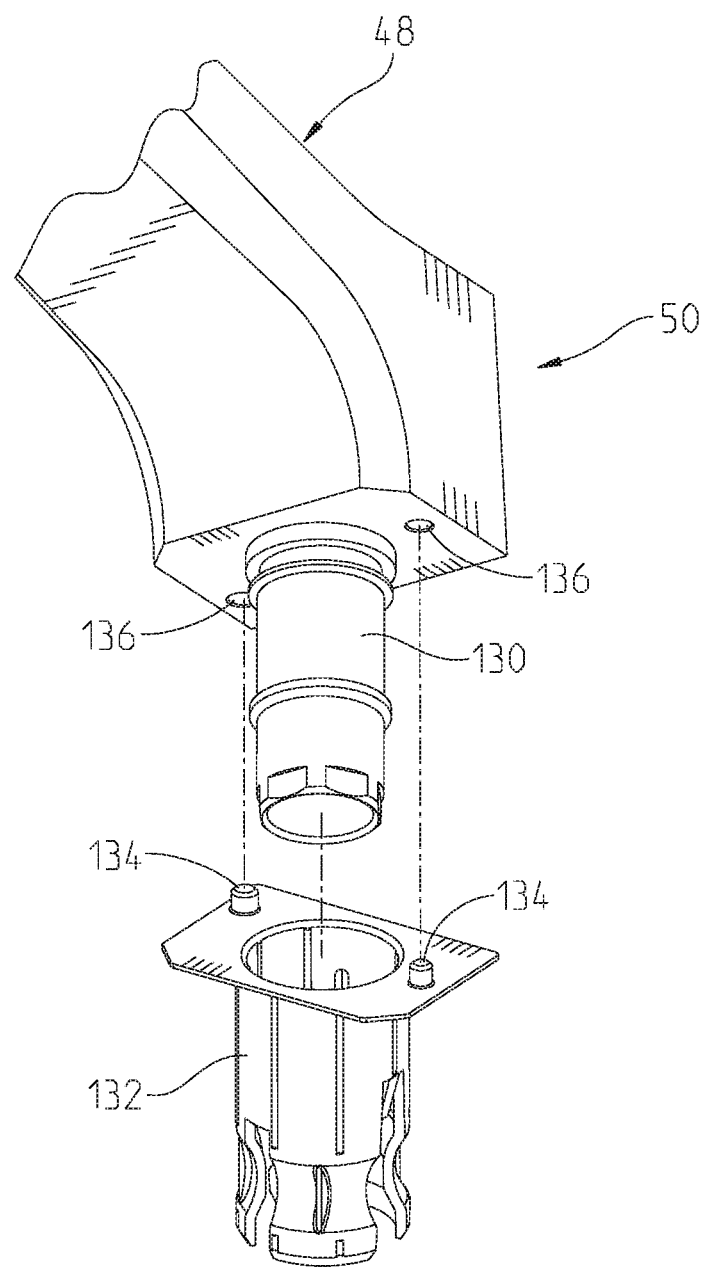
FIG. 7 is an exploded perspective view of a rotatable coupling of the swing arm of the illustrative faucet of FIG. 1.

With reference to FIGS. 5 and 7, the swing arm rotatable coupling 52 between the swing arm 48 and the hub 16 illustratively includes a spout tube 130 coupled to the first end 50 of the swing arm 48. Illustratively, the spout tube 130 is fixed to the first end 50 of the swing arm 48 by conventional fastening means, such as threads and/or adhesives. A retainer 132 receives the spout tube 130, and is supported between the spout tube 130 and the hub 16. Upwardly extending posts 134 of the retainer 132 are secured within openings 136 formed within the swing arm 48 (FIG. 7). The retainer 132 is supported within the passageway 29 of the hub 16 for rotation therebetween.

Figure 9:
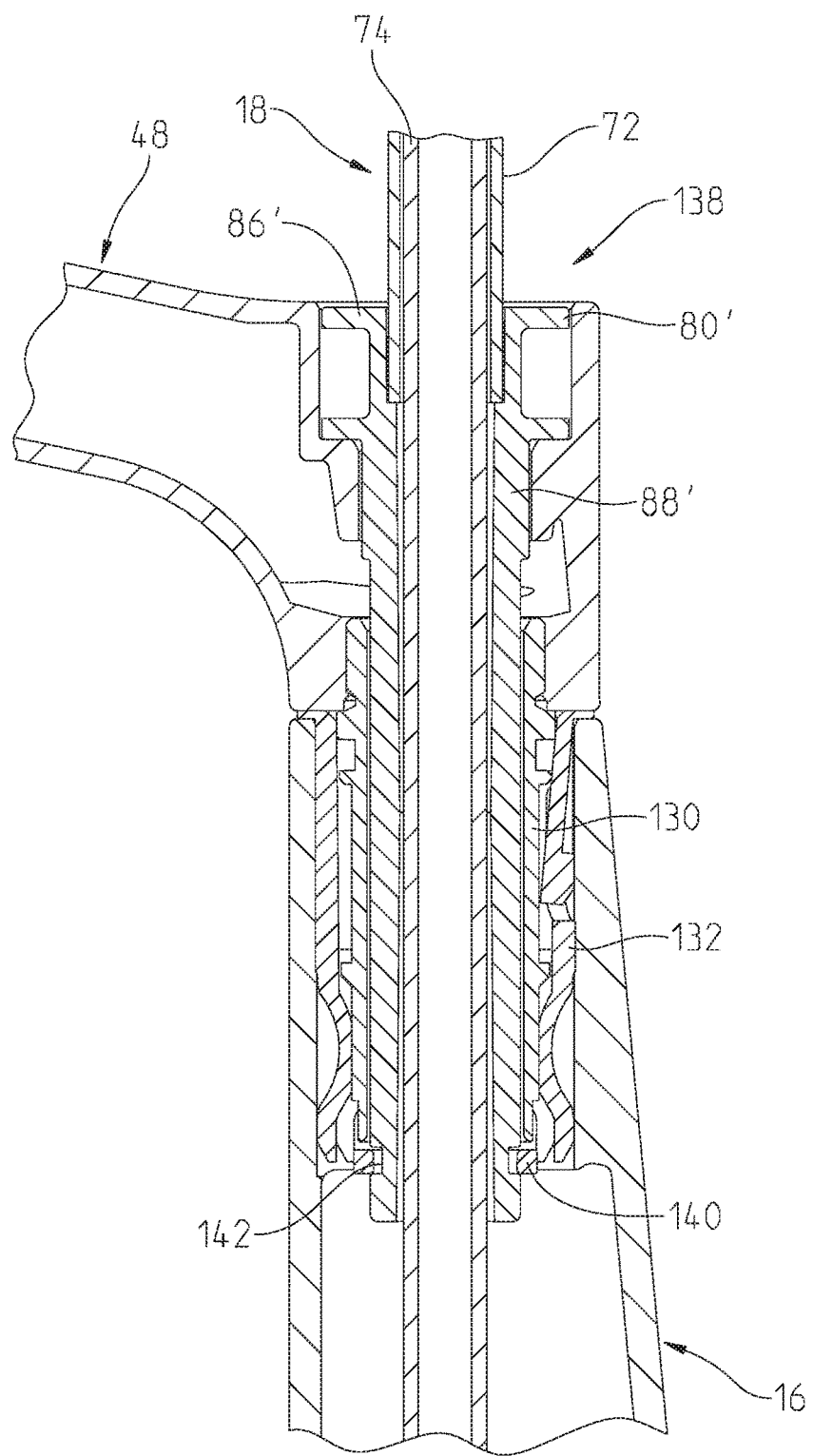
FIG. 9 is a cross-sectional view of the inlet end pivot coupling of FIG. 8.

With reference to FIGS. 8 and 9, a further illustrative inlet end or first pivot coupling 138 illustratively includes many similar features to the pivot coupling 58 identified above. As such, similar components will be identified with like reference numbers. The illustrative first pivot coupling 138 of FIGS. 8 and 9 includes a modified adapter or housing 80' including an upper portion 86' and an extended lower portion 88' received within the spout tube 130 and retained by a clip 140. More particularly, the clip 140 is retained within a groove 142 formed in the lower portion 88' of the housing 80'.

Figure 10:
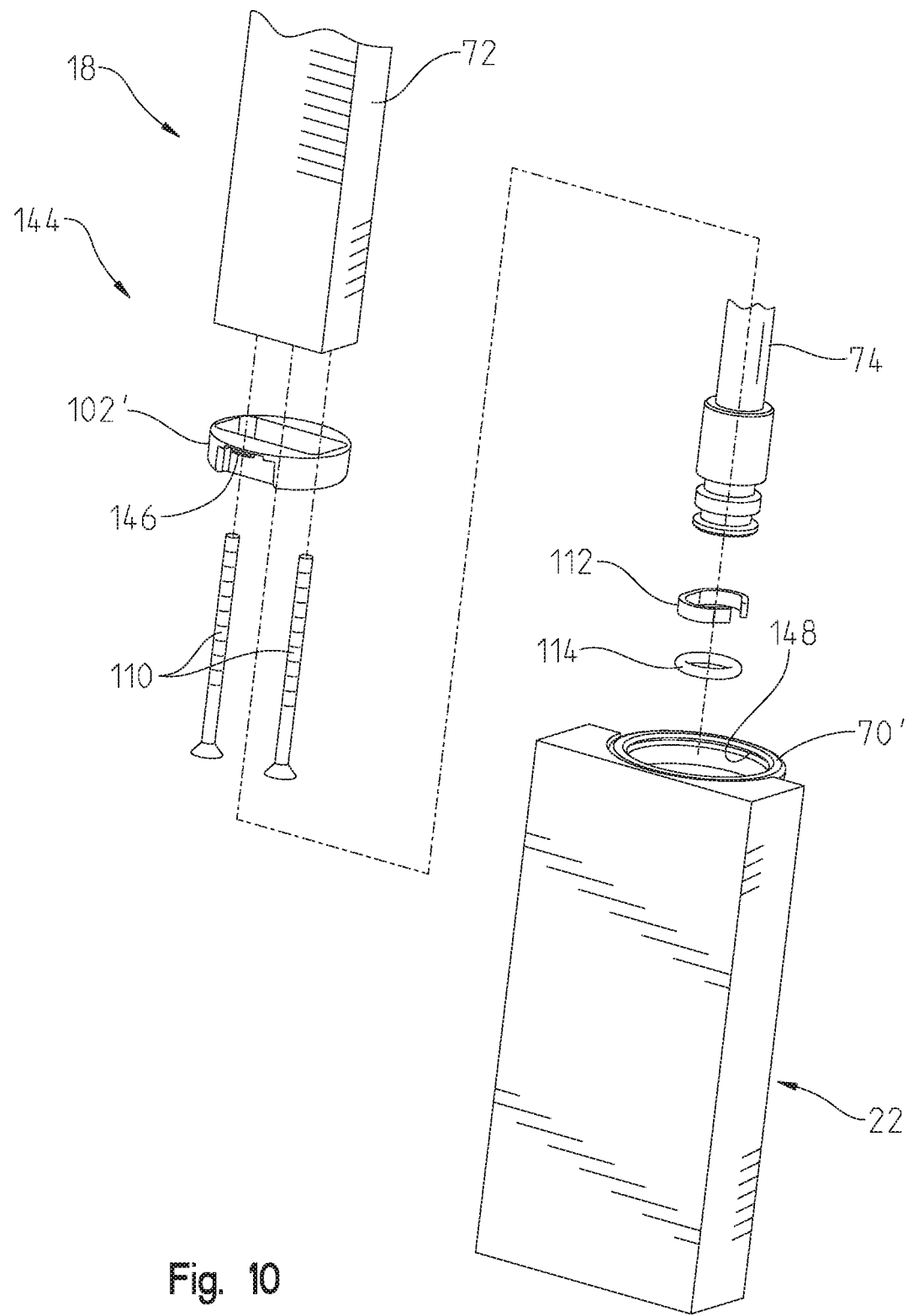
FIG. 10 is an exploded perspective view of another illustrative outlet end pivot coupling of the hose assembly.
Figure 11:
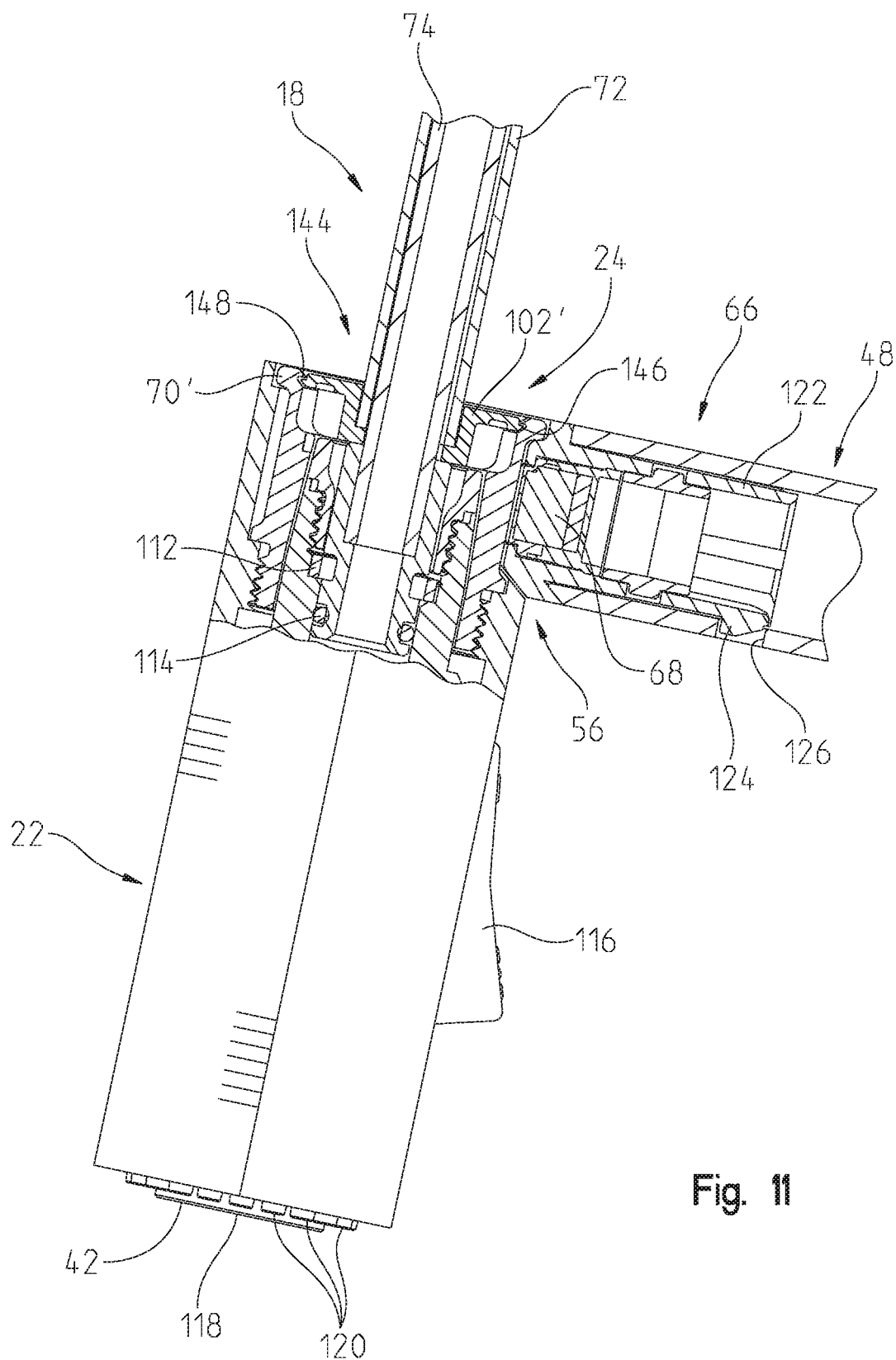
FIG. 11 is a cross-sectional view of the outlet end pivot coupling of FIG. 10.

With reference to FIGS. 10 and 11, a further illustrative outlet end or second pivot coupling 144 illustratively includes many similar features to the pivot coupling 60 identified above. As such, similar components will be identified with like reference numbers. The illustrative second pivot coupling 144 of FIGS. 10 and 11 includes a modified adapter or rotatable disc 102' including a retaining finger or tab 146 configured to be received within an undercut or groove 148 formed within the washer 70'. Engagement between the tab 146 and the groove 148 assists in retaining the outlet end 24 of the hose 18 within the sprayhead 22.

Figure 12:
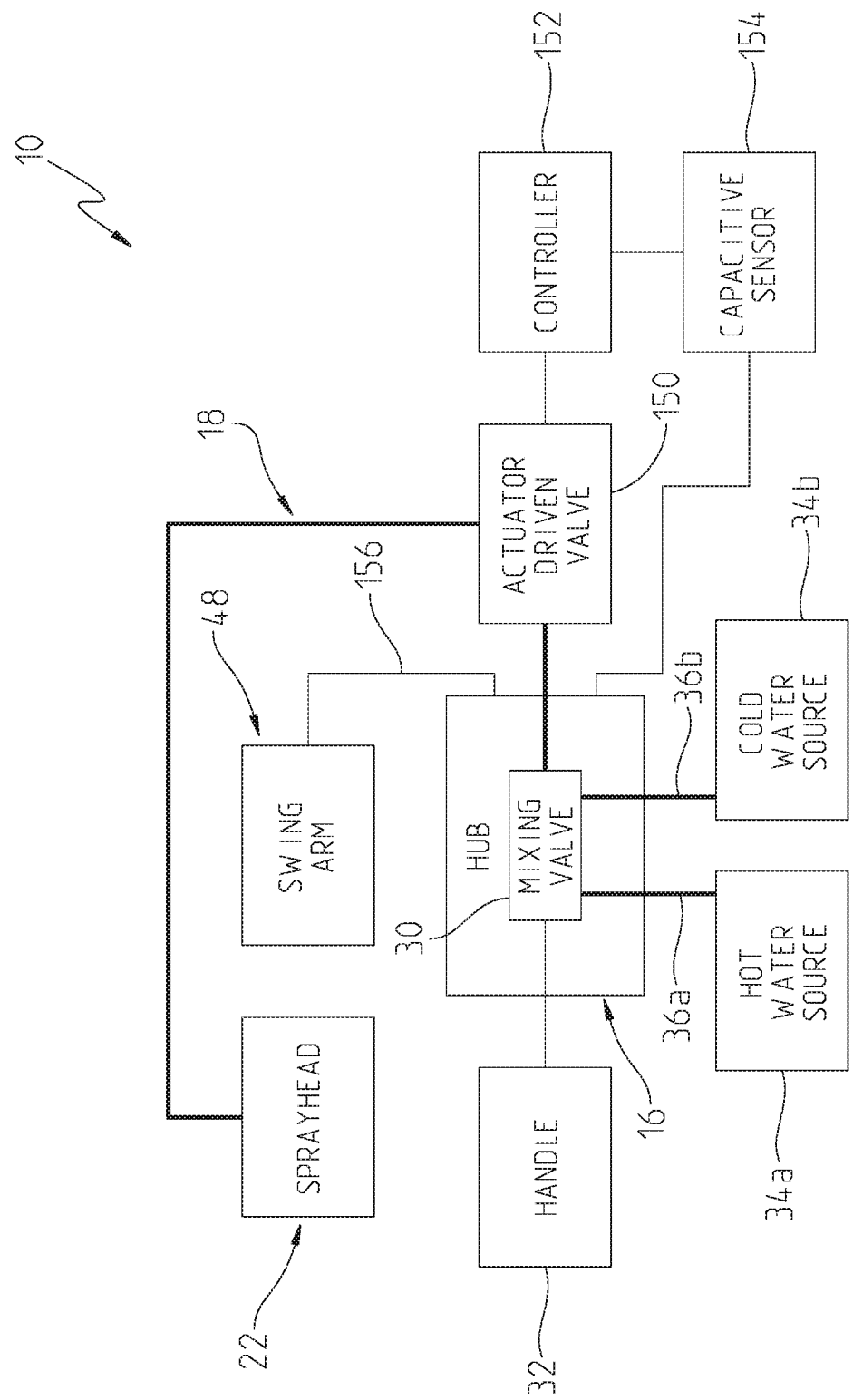
FIG. 12 is a diagrammatic view of the illustrative faucet of FIG. 1, showing various electrical connections.

With reference to FIG. 12, an actuator driven valve 150, illustratively an electrically operable valve, may be fluidly coupled in series with the mixing valve 30. Illustratively, a controller 152 is electrically coupled with the actuator driven valve 150. The controller 152 is configured to control the opening and closing of the actuator driven valve 150, and therefore to control the flow of water from the mixing valve 30 to the outlet 42 of the sprayhead 22. A user input, illustratively a capacitive sensor 154, is electrically coupled with the controller 152 and with the hub 16. Other types of user inputs may be substituted for the capacitive sensor 154, such as infrared sensors.

In the illustrative embodiment of FIG. 12, a capacitive coupling 156 is positioned between the hub 16 and the swing arm 48. As such, the capacitive sensor 154 is operably coupled to the hub 16 and to the swing arm 48 (through the hub 16 and the capacitive coupling 156). The handle 32 is also electrically coupled to the capacitive sensor 154. The hub 16 and the swing arm 48 are illustratively formed of an electrically conductive material such as a plated metal, such that contact with (or close proximity to) the hub 16 and/or swing arm 48 from a user is detected by the capacitive sensor 154.

The capacitive coupling 156 is illustratively defined by the swing arm pivot coupling 52. More particularly, the capacitive coupling 156 is defined between the spout tube 130 and the hub 16 through the retainer 132, wherein the spout tube 130 is formed of an electrically conductive material, such as metal, and the retainer 132 is formed of a polymer. In the illustrative embodiment, the sprayhead 22 is electrically isolated from the swing arm 48 by the nest 122. More particularly, the nest 122 is formed of an electrically non-conductive material, such as a polymer.

Although the invention has been described in detail with reference to certain preferred embodiments, variations and modifications exist within the spirit and scope of the invention as described and defined in the following claims.

The invention claimed is:

1. A faucet comprising:
a hub;
a hose including a polygonal shaped transverse cross section, the hose having a first end and a second end opposite the first end, the first end of the spray hose operably coupled to the hub;
a sprayhead operably coupled to the second end of the hose;
a first pivot coupling operably coupled to the hub and the first end of the hose, the first pivot coupling including a first adapter configured to permit rotation of the hose relative to the hub;
a second pivot coupling operably coupled to the sprayhead and the second end of the hose, the second pivot coupling including a second adapter configured to permit rotation of the sprayhead relative to the hose;
a swing arm including a first end operably coupled to the hub and a second end supporting the sprayhead, wherein the hose extends above the swing arm;
a capacitive coupling positioned between the hub and the swing arm;
a capacitive sensor operably coupled to the swing arm through the capacitive coupling;
a controller operably coupled with the capacitive sensor; and
an actuator driven valve fluidly coupled to the hose and controlled by the controller.

2. The faucet of claim 1, wherein the hub includes a circular recess configured to receive the first adapter, and the sprayhead includes a circular recess configured to receive the second adapter.

3. The faucet of claim 1, wherein the first end of the swing arm is configured to rotate about a longitudinal axis of the hub.

4. The faucet of claim 1, wherein the hose includes a cylindrical tube formed of a cross-linked polyethylene.

5. The faucet of claim 1, further comprising a mixing valve supported by the hub and fluidly coupled to the hose, and an actuator driven valve fluidly coupled to the mixing valve.

6. The faucet of claim 1, wherein the sprayhead is releasably coupled to the second end of the swing arm.

7. The faucet of claim 6, further comprising a magnetic coupling releasably coupling the sprayhead to the second end of the swing arm.

8. The faucet of claim 1, wherein an outer sheath of the hose is formed of a flexible material, and the flexible material comprises a thermal plastic elastomer.

9. The faucet of claim 8, wherein the first pivot coupling is coupled to the outer sheath at the first end of the hose, and the second pivot coupling is coupled to the outer sheath at the second end of the hose.

10. A faucet comprising:
a hub;
a hose including a polygonal shaped transverse cross section, the hose having a first end and a second end opposite the first end, the first end operably coupled to the hub;
a sprayhead operably coupled to the second end of the hose;
a swing arm having a first end and a second end opposite the first end, the swing arm operably coupled to the hub at the first end, the swing arm supporting the sprayhead at the second end of the swing arm and rotatable about a longitudinal axis of the hub, the hose extending above the swing arm;
a first pivot coupling operably coupled to the hub and the first end of the hose, the first pivot coupling including a first adapter;
a second pivot coupling operably coupled to the sprayhead and the second end of the hose, the second pivot coupling including a second adapter;
wherein the first pivot coupling rotates the first end of the hose about a first pivot axis, the second pivot coupling rotates the second end of the hose about a second pivot axis, and the swing arm is configured to rotate independently of the first pivot coupling and the second pivot coupling;
a capacitive coupling positioned between the hub and the swing arm;
a capacitive sensor operably coupled to the swing arm through the capacitive coupling;
a controller operably coupled with the capacitive sensor; and
an actuator driven valve fluidly coupled to the hose and controlled by the controller.

11. The faucet of claim 10, further comprising a magnetic coupling releasably coupling the sprayhead to the second end of the swing arm.

12. The faucet of claim 10, wherein the hub further includes a mixing valve fluidly coupled to the hose.

13. The faucet of claim 10, wherein the hose further includes an outer sheath having a rectangular shaped transverse cross section, the outer sheath enclosing an inner waterway comprising a cylindrical tube.

14. The faucet of claim 13, wherein the outer sheath comprises a thermal plastic elastomer and the inner waterway comprises a cross-linked polyethylene.

15. The faucet of claim 13, wherein the first adapter is coupled to an outer sheath at the first end of the hose.

16. The faucet of claim 15, wherein the second adapter is coupled to an outer sheath at the second end of the hose.

\* \* \* \* \*